ized by Examiner—Edgar W. Geoghegan
Assistant Examiner—A. M. Zupcic
Attorney, Agent, or Firm—Ken C. Decker; William N. Antonis

United States Patent
Thomas

[11] 3,818,705
[45] June 25, 1974

[54] POWER BOOST DEVICE
[75] Inventor: Alfred William Thomas, Saarbrucken, Germany
[73] Assignee: Deutsche Bendix Austustungs GmbH, Saarbrucken, Germany
[22] Filed: Mar. 16, 1973
[21] Appl. No.: 341,805

[30] Foreign Application Priority Data
Mar. 30, 1972 Germany............................ 2215752

[52] U.S. Cl.................................... 60/548, 60/547
[51] Int. Cl.............................................. F15b 7/00
[58] Field of Search ............. 60/547, 548, 567, 581, 60/555; 91/460, 453

[56] References Cited
UNITED STATES PATENTS

| | | | |
|---|---|---|---|
| 3,103,786 | 9/1963 | Hager | 60/555 |
| 3,416,316 | 12/1968 | Lewis | 60/581 |
| 3,421,320 | 1/1969 | Kershner | 60/581 |
| 3,683,619 | 8/1972 | Belart | 60/548 |

[57] ABSTRACT

A power boost device for a split braking system for an agricultural tractor, comprising a servomotor and a servo valve. The valve housing is provided with an inlet port, an output port and an exhaust port. The spool valve, movable in the valve housing, includes a central bore and radial passages to selectively communicate the inlet port and the exhaust port with a work port connected to the working chamber of the servomotor. An output piston is located in said working chamber and comprises a plunger projecting into an enclosed control chamber. Into said control chamber are also projecting two input plungers respectively connected to independent brake pedals. The control chamber is connected to a cavity located at one end of the servo valve housing, in which is slidably mounted the end of the spool valve. The output piston pressurizes a brake chamber connected to two separated braking systems through the intermediary of two control valves independently actuated by the brake pedals.

16 Claims, 1 Drawing Figure

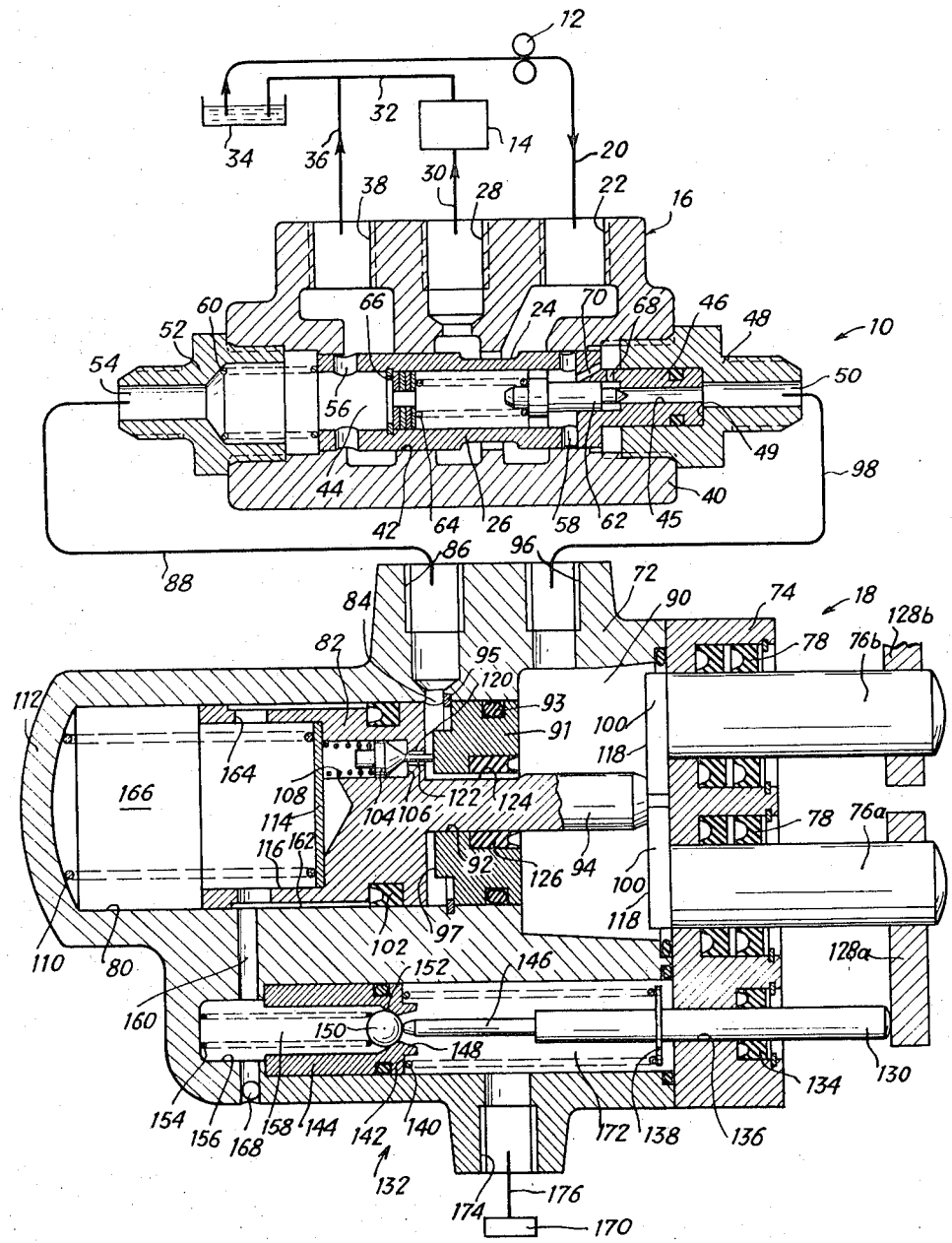

POWER BOOST DEVICE

The invention relates to a power boost device for a split braking system for agricultural tractors or the like.

It is known that the weight of implement carried behind an agricultural tractor tends to tip the tractor backwards reducing the load on the front wheels thus limiting the effectiveness of the normal steering.

A traditional solution to this problem consists in using separate mechanically operated rear wheel brakes whereby permitting the driver to steer his tractor by differential rear braking.

Among the problems arising with the use of the differential braking is the necessity for recoupling the two braking systems for normal road driving. For normal driving these pedals are simply latched together so that both brakes are operated together. This system has the advantage that even if the operator forgets to latch the pedals together, he can still, in normal road driving, push both pedals together. The trend towards heavier tractors has taken the required braking effort out of the range of what can be achieved by normal muscular effort. Heavier tractors therefore typically require and are equipped with some type of power braking system.

The main object of this invention is to provide a power braking system for separated or coupled brakes, which retains the coupling simplicity of the older mechanical system and at the same time reduces operator effort to an acceptable level.

The invention proposes a power boost device especially for a split braking system comprising servo valve means in a valve housing for controlling a variable working fluid pressure acting on an output piston sealingly received in a working chamber of a servomotor housing, said output piston actuating pressure generating means connected to at least two sets of pressure responsive brake actuators, said device being characterized in that said servo valve means are responsive to a control pressure of an incompressible fluid contained in a control chamber, said control pressure varying as a function of the displacements in said control chamber of at least two input plungers and of an output plunger operatively connected to said output piston, each of said input plungers cooperating with a brake valve means thereby permitting a fluid communication between said pressure generating means and the corresponding set of brake actutators when the displacement of the said input plunger into said control chamber exceeds a predetermined value.

Other advantages and further features of the invention will appear from the following description taken in reference with the accompanying drawings in which the sole FIGURE represents a vehicle braking system including a power boost mechanism according to the invention represented in a diagrammatic cross-sectional view.

When considering the system of the FIGURE, a power boost mechanism 10 disposed between a hydraulic pump 12 and power hydraulic device such as a power steering gear 14, by way of example, essentially comprises a control valve 16 and an output servomotor 18. In such a system fluid flows from pump 12, via conduit 20 to an inlet port 22 of control valve 16. Fluid flows through the control valve 16 via a groove 24 provided in a spool valve 26 to an outlet port 28, and thence, via a conduit 30 to the power steering gear 14. As the steering gear 14 is normally controlled by an open center valve (not shown) the fluid returns via a conduit 32 to the pump reservoir 34. Conduit 32 is provided with a T fitting to which a conduit 36 from a return port 38 of control valve 16 is assembled.

Referring now to control valve 16, this comprises a valve housing 40 with a bore 42 therein communicating with an inlet port 22, an outlet port 28, and a return port 38. Bore 42 slidably receives the spool valve 26 which is provided with a longitudinal passage 44. As shown on the FIGURE, one end of the spool valve 26 presents a smaller diameter portion 46 which is sealingly received in a cap 48 secured to housing 40 to close one end of bore 42. Cap 48 includes a control port 50 communicating with a channel 45 of portion 46. The other end of bore 42 is closed by a plug 52 secured to housing 40. The plug 52 is provided with a working port 54 communicating with passage 44.

The spool valve 26 is provided with a first set of holes 56 cooperating with bore 42 to control the exhaust communication between return port 38 and working port 54, and with a second set of holes 58 cooperating with bore 42 to control supply communication between inlet port 22 and working port 54. As shown in the FIGURE, a spring 60 abutting plug 52 yieldably urges spool valve 26 towards a shoulder 49 of cap 48 into its normal rest position wherein said exhaust communication is opened and said supply communication is closed.

A relief valve 62 is mounted in spool valve 26 between passage 44 and channel 45. A spring 64 abutting a washer 66 secured in spool valve 26 urges said relief valve to its closed position. As explained later, when said relief valve 62 is opened fluid flows from bore 45 to passage 44 through apertures 68 and 70 provided in spool valve 26.

Referring now to servomotor 18, this comprises a housing 72 with end cover 74 secured thereto, which may also form a mounting flange. The mounting flange 74 is arranged to guide input plungers 76a and 76b, which are attached at their outer ends to separate brake pedals (not shown) which are equipped with some means of latching.

The servomotor housing 72 is provided with a bore 80, sealingly receiving an output piston 82 to define a working chamber 84. Working chamber 84 communicates with working port 54 of control valve 16 via port 86 and conduit 88. Working chamber 84 is separated from a control chamber 90 by a plug 91 sealed by a toroidal seal 93 and located by a spring ring 95, secured in the housing 72 at the working chamber face 97 thereof as shown in the drawing.

The control chamber 90 is defined by a cavity located in housing 72 between plug 91 and end cover 74, and communicates with control port 50 of control valve via a port 96 and a conduit 98. An aperture 92 is provided in plug 91, to sealingly receive a rod portion of the output piston defining output plunger 94.

The input plungers 76a and 76b sealed by seal assemblies 78 housed in end cover 74, project into the control chamber 90. Eccentric to the axis of the input plunger 76a and 76b and secured to the inboard end thereof, are arranged shoulders 100 to overlap the free end of the output plunger 94.

Piston 82 houses seal 102 and check valve 104 spring loaded against seal 106 integral with piston 82, by a spring 108. Another spring 110 reacting between closed end 112 of housing 72 and spring seat 114 fitted into a recess 116 of piston 82, urge the latter so that, in the rest position as drawn, output plunger 94 is maintained in contact with the edge 118 of shoulders 100 of both input plungers 76. Spring seat 114 also supports spring 108 of check valve 104 which is extended through passage 120 of piston 82 by reduced diameter portion 122 which in the rest position contacts face 97 of the plug 91, holding check valve 104 clear of seat 106. Furthermore, a flat 124 provided on output plunger 94 cooperates with a seal block 126 mounted in aperture 92 to permit when output plunger 94 is in its rest position a refill communication from working chamber 84 to control chamber 90.

At their outer ends input plunger 76a and 76b carry suitably attached cross-members 128a and 128b which contact push-rods 130 of auxiliary brake valve assemblies 132. For reason of clarity, one only of these assemblies is shown in the FIGURE, more particularly the one cooperating with input plunger 76a, however the two assemblies are identically similar. Push-rod 130 is sealed by seal 134 and passes through suitable hole 136 of end cover 74. A circlip 138 locates a spring 140 which reacting against face 142 of a check valve housing 144, urges push-rod 130 into contact with cross-member 128a. Push-rod 130 has a reduced diameter portion 146 which passes partially through hole 148 of check valve housing 144 into close proximity, but not contact, with check valve 150 which is held in sealing contact with valve seat 152 by spring 154. Check valve housing 144 is sealed by a toroidal ring and together with recess 156 in housing 72 forms a chamber 158 which is connected by passage 160 to an annular chamber 162 of piston 84 which in turn communicates via holes 164 with a pressure chamber 166 defined between the closed end of bore 80 and recess 116 of output piston 82. Passage 160 is sealed as shown on the FIGURE by a suitable plug 168. Finally, the auxiliary brake valve assemblies 132 control the fluid communication between the pressure chamber 166 and two independent sets of at least one brake actuators, one set 170 only is shown on the drawing as already stated. More particularly fluid flows from chamber 166 in a passage 160 and chamber 158, through valve hole 148 to chamber 172 provided in housing 72, and directly connected to a brake actuator 170 via port 714 and conduit 176.

By way of example, input plunger 76a cooperates with the shown valve assembly 132 to control the actuation of the brake cylinder 170 of the rear left wheel of an agricultural tractor, whereas the input plunger 76b cooperates with the unshown valve assembly to control the actuation of the brake cylinder of the rear right wheel of the said tractor.

The power boost mechanism as hereinabove described comprises two units, i.e.: control valve 16 and servomotor 18 which are connected together by two conduits 88 and 98. Such a structure provides a substantial advantage since two small packages can often be installed in a vehicle where one larger package cannot. Obviously, to avoid pipework the two units can with minor corrections, be bolted together when installation convenience allows.

It should be also pointed out that, with such a power boost mechanism, tractor manufacturers can easily dispose the control valve 16 close to the power steering valve to obtain the best operation of the steering unit, as those skilled in the art will understand.

Furthermore, the separation of the unit into two parts facilitates the use of aluminium alloys for the servomotor 18, where because all moving parts are sealed elastomerically, considerations of leakage due to differential expansion do not arise. the control valve 16 is made of ferrous alloy so that the close clearances required between spool valve 26 and valve housing 40 can be maintained under all temperature conditions.

The operation of the power boost mechanism illustrated in the FIGURE is as follows:

The spool valve 26 is at rest position to open fluid supply for pwer steering 14 through groove 24. the working chamber 76 is connected to reservoir 34 since the exhaust communication through hole 56 is opened. The control chamber is also connected to reservoir 34 via flat 124 on output plunger 88. Then with the brakes unoperated and the brake boost mechanism therefore in the "at rest" position condition as shown on the FIGURE the fluid flow from pump passes, with insignificant lose of pressure to reservoir 34 via the control valve and the hydraulic unit 14 which is in its open center position.

Furthermore, the brake cylinders 170 in their "rest" position are connected via conduit 176 and port 172 through hole 148, chamber 158, passage 160, annulus 162, holes 164, open check valve 104, working port 54, conduit 88, port 54 of servo-valve 10 to the reservoir 34. It should be noted that the check valve 150 is so slightly loaded by spring 154 that no significant brake cylinder pressure can exist in the "at rest" position.

Assuming firstly that both brake pedals are latched together, the pedal force moves input plunger 76a and 76b and therefore output piston 82 leftwards when considering the FIGURE, then displacing fluid from chamber 166 to brake cylinders 170, through passages 160 and brake valve assembly 132. In effect, the check valves 150 are held off their seats by action of push-rod 130. During the initial movement no significant pressure can be raised by this displacement because chamber 166 is connected to reservoir 34, and because the flat 124 on the output plunger 94, permits communication between control chamber 90 and reservoir 34.

After approximately one millimeter of input plunger movement check valve 104 closes and the flat 124 passes within seat 126 effectively separating respectively chamber 166 from reservoir 34 and control chamber 90 from working chamber 84. Similarly, the displacement of piston 82 induces the closing of the refill passage 120. Further displacement of input push-rods 76a and 76b tends to compress the nominally incompressible fluid in chamber 90. Because push-rods 76a and 76b each have a cross-sectional area greater than that of output plunger 94 said plunger 94 is displaced through a distance which is dependent on the ratio equal to the sums of effective areas of plungers 76a and 76b divided by the effective area of plunger 94. As shown in the FIGURE, each input plunger 76 has approximately twice the area of the output plunger 94. Therefore, the stroke of output plunger 94 will be four times that of the input plungers 76a and 76b.

Immediately, the brake clearances are taken up, further brake cylinder displacement can only be caused by an increase in brake cylinder pressure. This increase is achieved as follows:

This driver increases load on the brake pedals. This further compresses fluid in control chamber 90 and raises the pressure therein. At a predetermined level, this pressure overcomes the resistance of the spool valve return spring 60, and the spool valve moves, throttling the passage between pump 12 and downstream hydraulic unit 14, closing the passage between port 56 and reservoir 34 and connecting port 58 to the pump 12. Pump pressure is therefore applied via conduit 88 and port 86 to working chamber 84, acting on the full face area of piston 82 which moves to displace more fluid from chamber 166 and to increase pressure in the brake cylinders. Because the pressure in chamber 166 is applied to the spring loaded piston portion 46 of the spool valve 64, this pressure will also be substantially felt in chamber 90 and therefore reacts against the input plungers 76a and 76b. The pressure in chamber 158 reacts at the same time against the effective area of the auxiliary valve assemblies. Because the pressure drop across valves 152 can be so designed as to be negligible, the force to overcome by the pedals is therefore approximately, when neglecting friction, Fp equal to the braking pressure multiplied by the sums of effective areas of input plungers 76 and push-rods 130. At the same time the total braking force Fb is approximately equal to the braking pressure multiplied by the sum of effective areas of the brake cylinders 170. Fb/Fp gives the servo ratio.

Any increase in pedal force will displace the spool valve 26 further, increasing the braking pressure and also increasing the pressure in chamber 90. The force reacting against the brake pedal force is therefore proportional to brake pressure.

Release of the brake pedal force causes the systems to return to its rest position with residual seal friction being overcome by return spring 110 and 140. Spring 110 in particular is designed so that its fitted load is greater than the sum of seal frictions to be encountered. It can, in returning piston 82, raise a slight vacuum in chamber 158 which will assist the residual pressure of returning fluid from the brake cylinders in keeping check valves 150 off their seats ensuring an easy brake cylinder return stroke.

Assuming now that the brake pedals are unlatched, the single brake operation is similar to the double brake operation except that only one brake pedal is depressed. Therefore only one input plunger 76a or 76b and only one push-rod 130 is depressed, and then fluid flow only to one set of brake cylinders occurs. Since Fb and Fp had been later divided by two with respect to the double brake operation, the servo-ratio Fb/Fp remains unchanged. Moreover, the displacement of one input plunger remains proportional to the displacement of the pistons in the actuated brake cylinders. It should be pointed that the driver obtains the same relative difference of brake feel, between single and double brake operation, as with well known unpowered braking devices. The actual brake load is of course in both cases reduced proportionate to servo-ratio.

Assuming now that a mechanical or pressure failure impedes the power assist, actuation of at least one brake pedal permits the corresponding eccentric shoulder 100 of input plunger 76 to directly engage the output plunger 94 and then to actuate the working piston 82.

It should be noted that in the particular case where such a failure happens during braking operation, as a complementary force is applied by the driver to the brake pedal, control pressure in the chamber 90 rises until tentatively 4 Kg/cm2. At this state relief valve 62 is forced off its seat against the force of spring 64 and the fluid is discharged from control chamber 90. Then input plunger 76 can engage output plunger 94 so that the input plunger/output plunger stroke ratio becomes equal to unity.

Finally, some modifications may be brought to the above described embodiment:

The refill valve 104 in piston 82 could be a second hole leading to the left side of the piston seal 120, from port 86, which would be sealed after a short piston movement as in a current master-cylinder practice.

Conversely, the refill valve including flat 124 could be substituted by a poppet valve (not shown) of the kind of valve 104, located in a refill passage through partition plug 91. Such poppet valve includes a stem projecting into working chamber 120 to engage piston 82 when the latter stays in its rest position. The sealing cooperation between the poppet valve and its seat being ensured during braking operation due to the fact that control pressure remains always slightly higher than the working pressure.

Thanks to this last feature, the partition plug 91 is fitted in the housing by a single ring 95 and the friction of the annular seal 93. However, any other known means to locate the partition plug may be utilized.

The boost device can of course be arranged to work through a well known master-cylinder, furthermore the port 28 can be plugged and the port 20 be connected to an hydraulic accumulator. Finally, according to the customer's requirement, the number and the effective areas of the input plungers can be changed.

I claim:

1. In a power boost mechanism for a system having a multiplicity of circuits, housing means defining a working chamber and a control chamber therewithin, a piston slidably mounted in said working chamber, pressure generating means actuated by said piston, working passage means connecting said pressure generating means to each of said circuits, valve means responsive to the hydraulic pressure level in said control chamber to shift from a released position venting said working chamber to an actuator position communicating successively higher fluid pressure levels into said working chamber as said valve means is shifted from said released position, an output plunger operatively connected to said piston and slidably received within said control chamber, operator-actuated means including at least two input plungers slidably received within said control chamber, the hydraulic pressure level in said control chamber varying as a function of the displacements of said plungers within said control chamber from their rest position, and a working valve in each of said working passage means, each of said input plungers cooperating with a corresponding one of said working valves to thereby open said corresponding working valve upon shifting of the corresponding input plunger from its rest position.

2. The invention of claim 1:
said input plungers engaging said output plunger to permit manual actuation of said piston upon failure of the hydraulic pressure level in said control chamber.

3. The invention of claim 1:

said input plungers having a greater transverse cross-sectional area than that of the output plunger, whereby the stroke of the output plunger is proportionally more than the stroke of the input plunger.

4. The invention of claim 3:
said input plungers having equal transverse cross-sectional areas.

5. The invention of claim 1; and
relief valve means responsive to the pressure differential between the control chamber and the working chamber to vent the control chamber when said pressure differential between the control and working chambers exceeds a predetermined amount.

6. The invention of claim 1:
said working chamber being defined between one face of said piston and a portion of said housing, said pressure generating means including a pressure chamber defined between the other face of said piston and another portion of said housing.

7. The invention of claim 6:
resilient means yieldably urging said piston toward a rest position, refill passage means communicating said working chamber with said pressure chamber, and refill valve means permitting communication through the refill passage means when the piston is disposed in the rest position, but terminating communication through said refill passage means when the piston moves away from the rest position.

8. The invention of claim 1:
said working valve comprising a valve housing, a valve seat in said valve housing, a valve element resiliently urged toward said valve seat, a fixed support, a rod member slidably mounted on said fixed support, and a mechanical linkage between said rod member and one of the input plungers.

9. The invention of claim 8:
said valve housing and said fixed support being integral with said housing means.

10. The invention of claim 1:
a partition within said housing means separating the working chamber from the control chamber, an aperture in said partition, said output plunger extending through said aperture into said control chamber.

11. The invention of claim 10; and
resilient means normally urging said piston toward a rest position wherein said output plunger abuts said input plungers.

12. The invention of claim 11; and
a compensating passage communicating said working chamber to said control chamber, a compensating valve controlling communication through said compensating passage, said compensating valve including a valve member actuated by the output plunger and a valve seat located in said compensating passage, said compensating valve being open when said output plunger is in said rest position, said compensating valve being closed when the displacement of said output plunger from said rest position reaches a predetermined value.

13. The invention of claim 12:
said compensating valve consisting of a flat on said output plunger cooperating with an annular seal located around said aperture.

14. The invention of claim 1:
said housing means defining a bore therewithin having an inlet port communicating said bore with a fluid pressure source, an outlet port, and a return port communicated to a fluid reservoir, and means communicating the bore to the working chamber, said valve means being a spool valve slidable in said bore having a reaction surface on one end thereof, said reaction surface being exposed to the fluid pressure level in said control chamber to shift said spool valve to control communication between said ports and to said working chamber to develop fluid pressure in the working chamber when a brake application is effected, and spring means yieldably urging said spool valve to a released position.

15. The invention of claim 14:
said spool valve having a reaction area opposing said reaction surface, said reaction area being communicated to said working chamber whereby the spool valve is shifted against the force of said spring means when the fluid pressure level in the control chamber exceeds the fluid pressure level in the working chamber by an amount necessary to overcome said spring means.

16. The invention of claim 15; and
relief valve means communicating said control chamber with the working chamber when the pressure level in the control chamber exceeds the pressure level in the working chamber by a predetermined amount substantially higher than the pressure differential between the control and working chamber required to overcome said spring means.

* * * * *